United States Patent
Barr

(10) Patent No.: US 7,184,130 B1
(45) Date of Patent: Feb. 27, 2007

(54) METHOD FOR IMPROVING THE RECEIVED SIGNAL TO NOISE RATIO OF A LASER RANGEFINDER

(75) Inventor: Keith E. Barr, Los Angeles, CA (US)

(73) Assignee: Exelys, LLC, Los Angeles, CA (US)

( * ) Notice: Subject to any disclaimer, the term of this patent is extended or adjusted under 35 U.S.C. 154(b) by 27 days.

(21) Appl. No.: 10/893,044

(22) Filed: Jul. 15, 2004

(51) Int. Cl.
*G01C 3/08* (2006.01)

(52) U.S. Cl. .................. 356/4.01; 356/4.02; 356/4.03; 356/5.01

(58) Field of Classification Search ............... 356/4.01
See application file for complete search history.

(56) References Cited

U.S. PATENT DOCUMENTS 5,298,905 A * 3/1994 Dahl ..................... 342/54

2004/0213565 A1* 10/2004 Kamalov et al. ............ 398/26

* cited by examiner

*Primary Examiner*—Thomas H. Tarcza
*Assistant Examiner*—Luke D. Ratcliffe
(74) *Attorney, Agent, or Firm*—Morrison & Foerster LLP

(57) ABSTRACT

An improved technique for a laser rangefinder includes a pulsed laser sending out a repetition of light pulses and the received signal (light pulse and noise components combined) being analyzed by continuous averaging of successive received signal discrete time sequences, each sequence beginning with the onset of transmitted laser light. Also, a circuit generates high potentials for the laser diode driving circuitry that simultaneously drives the laser diode, having at least one of several beneficial characteristics: It is conveniently synchronous with the light pulse send/receive process to reduce the effects of noise on the receive section. It is energy efficient in converting low battery potentials to higher voltages. Finally, it utilizes a minimized number of components, leading to high product economy.

10 Claims, 2 Drawing Sheets

METHOD FOR IMPROVING THE RECEIVED SIGNAL TO NOISE RATIO OF A LASER RANGEFINDER

BACKGROUND

Laser rangefinders determine the distance to a target by emitting a brief, narrow beam light pulse to a target and measuring the time for the reflected light to return. Since the speed of light in air is constant, accurate measurements can be obtained through the use of such devices. Most targets are non-reflective, absorbing some of the light and dispersing the remainder in all directions. As a result, the received light pulse is very faint and decreases as the square of the target distance. For laser rangefinders that emit 'eye safe' levels of energy, and have restricted receive lens areas, the received light pulse amplitude from any target over a few hundred yards in range is buried in photo detector noise.

Laser rangefinders typically establish a threshold that is above the noise level, and trigger a timing circuit upon the received pulse exceeding the threshold. Alternately, the threshold is set somewhat lower (into the noise), causing numerous authentic and false triggering 'hits', whereupon after several repetitive pulses, a correlation can be established between pulse hit results to establish a 'most probable' signal pulse location. This later technique is somewhat effective in improving the ability of the rangefinder to range more distant targets, but is computationally intensive. It can also require a significant amount of memory to be effective.

Furthermore, rangefinders that employ semiconductor laser diodes deliver extremely high current and extremely brief pulses to their laser diodes, while simultaneously supporting extremely sensitive receive circuitry to detect the very small reflected light pulse. Typical laser pulse peak currents can be from 2 to 20 amperes, with durations on the order of 5 to 25 nS. Typical received light pulses from distant targets can be as small as a few hundred photons. Integrating high voltage, high current switching devices along with sensitive receiving circuits into compact units is difficult.

The generation of extremely short, high current pulses is problematic when unavoidable driving component lead inductances are considered. A solution to overcoming the lead inductance problem is to operate the driving circuitry at rather high voltages (20 to several hundred volts), wherein a small capacitor is charged to a high voltage and then discharged with a semiconducting switching device into the laser diode. Such high voltages however, in a portable, battery powered system, are typically developed through the use of a switching power supply that will also generate switching noise that is deleterious to the sensitive receive circuitry.

BRIEF SUMMARY

An improved technique for a laser rangefinder includes a pulsed laser sending out a repetition of light pulses and the received signal (light pulse and noise components combined) being analyzed by continuous averaging of successive received signal discrete time sequences, each sequence beginning with the onset of transmitted laser light to reduce the effect of the noise components in the received signal.

Also, a circuit is provided for generating high potentials for the laser diode driving circuitry that simultaneously drives the laser diode, having at least one of several beneficial characteristics. It is conveniently synchronous with the light pulse send/receive process to reduce the effects of noise on the receive section. It is energy efficient in converting low battery potentials to higher voltages. Finally, it utilizes a minimal number of components, leading to high product economy.

DETAILED DESCRIPTION

Figure 3:
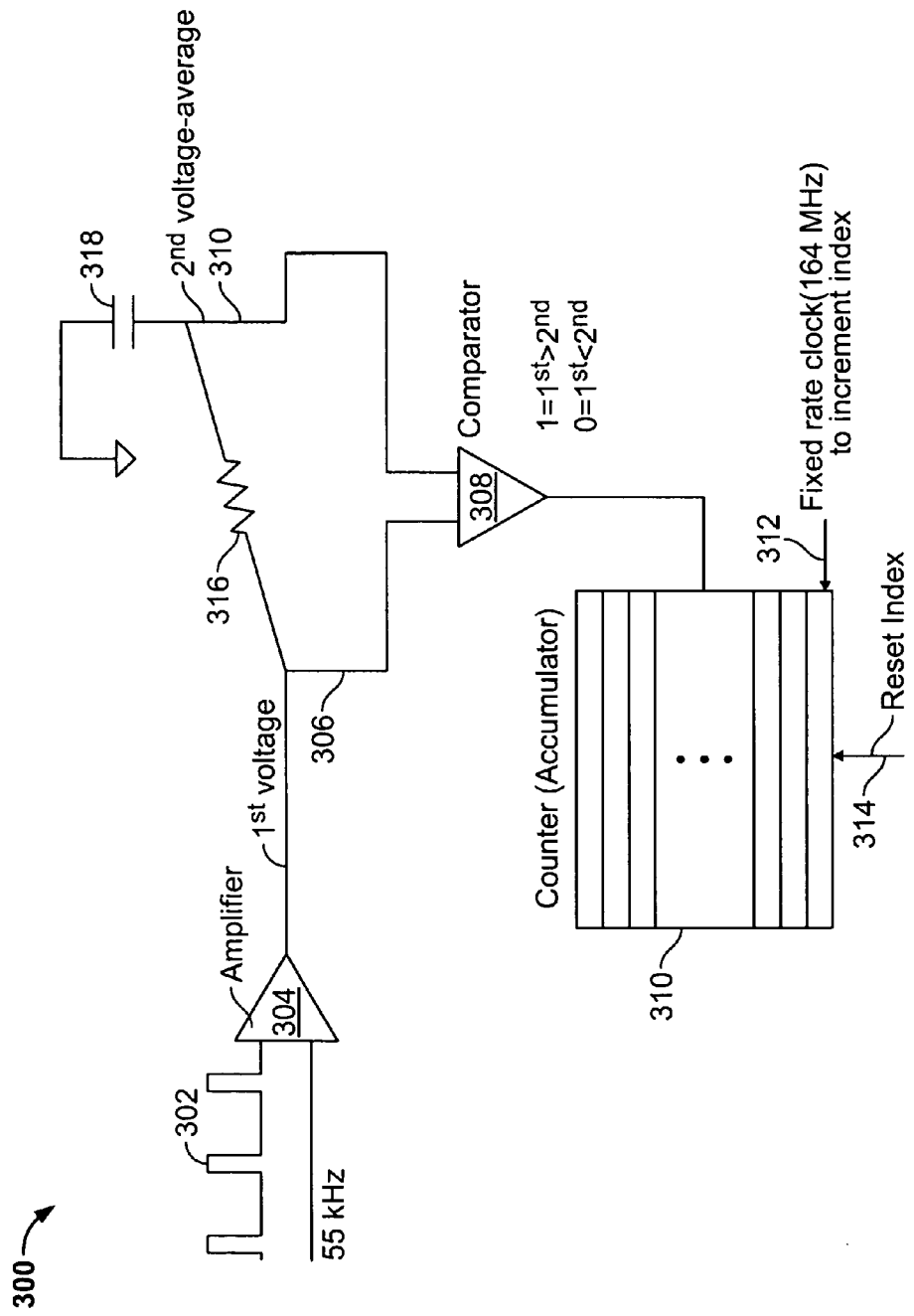
FIG. 3 illustrates circuitry usable to more reliably sample a laser rangefinder input signal.

We first describe, with reference to the circuitry 300 in FIG. 3, a method to improve the signal to noise ratio of a signal received by a laser rangefinder and usable to determine a range to a target. In the FIG. 3 example, a laser is forced to emit a very brief pulse (about 10 nS long) at a rate of about 55 KHz. The laser pulse is reflected off a target, and some of the light is converted to a voltage signal 302 by a photosensor (not shown), and amplified by an amplifier 304. The output of the amplifier 304 is provided as a first voltage signal 306 to a comparator 308. The first voltage signal 306 includes unavoidable photodetector and amplifier noise. An average ambient output of the amplifier 304 provides a second voltage signal 310 to the comparator 308. For example, in the FIG. 3 circuitry, the average ambient output of the amplifier 304 is the result of an RC averaged output, where a resistor 316 is connected to the output of the amplifier 304 and a capacitor 318 is connected between the resistor 316 and ground.

The output of the comparator 308 is a "1" when the first voltage signal 306 is greater than the second voltage signal 310. On the other hand, the output of the comparator 308 is a "0" when the first voltage signal 306 is less than the second voltage signal 310.

The comparator output logic signal is processed into a counter memory 310, under the control of a fixed rate clock signal 312. In one example, the fixed rate clock signal 312 is running at 164 MHz, which is a period of about 6 nS. The counter memory 310 is addressable by an index. The index is reset by a reset signal 314, which is typically asserted when a light pulse is emitted, or at least in some predetermined time relationship with the emission of a light pulse (and, as a result, to the distance over which the light traveled from the laser to the target, and to the photosensor). There may be, for example, 256 addressable locations in the counter memory 310.

In operation, each measurement begins by clearing all memory locations in the counter memory 310 to zero. After the index is reset by the reset signal 314, the index is incremented at each cycle of the clock 312, and the comparator value is accumulated into the location in the counter memory 310 addressed by the index. The index is incremented, and the comparator values accumulated, until the index reaches the last location in the counter memory 310. At this point, the acquisition cycle stops until the laser pulse is emitted again. Over an example period of 1 second, 55,000 laser pulses will be emitted, and each location in the counter memory 310 will have been addressed and accumulated into 55,000 times.

As a baseline, if no light is reflected as a result of a particular one second acquisition period, then the comparator 308 will on average provide an equal number of zeros and ones to each addressable location in the counter memory 310. That is, due to noise in the photodetector, the first voltage 306 is expected to be less than the average during half of the sample time periods (where each sample time period corresponds to the index having a different value) and greater than average during half of the sample time periods. Using the example set forth above then, each counter value is expected to be 55,000/2, or 27,5000, if no light is reflected as a result of the particular one second acquisition period.

On the other hand, if the light pulse is returned, even as a very small signal, then this will be indicated by the counter(s) that correspond to the time delay at which the returned light pulse is received. That is, those counters will be higher than 27,500, using the example above. In one example, a counter must be higher than the average count by an amount that is deemed to be statistically significant in order to be considered as indicating a return light pulse. In one example, the statistically significant amount is the square root of the total number of samples. For example, in the above example, the statistically significant amount would be the square root of 55,000, or 235.

In a situation where the received light pulse is buried in noise, the advantage of such noise averaging can be shown to be equal to the square root of the number of repetitive averages. For example, 100 such averages can improve the signal to noise ratio by a factor of 10, or 20 dB. In practice, for an 'eye safe' laser (by current regulatory constraints), an optimal repetition rate for the laser is about 55 KHz, and the signal to noise ratio improvement for a 1 second measurement is about 235, or 47 dB.

Government regulations that control 'eye safe' pulsed laser operation allow for lower repetition rates with correspondingly higher transmitted pulse amplitudes. However, the current regulations allow higher pulse powers only at frequencies below 55 KHz and, in that case, the increase in power is the fourth root of pulse frequency reduction. Therefore, the pulse repetition rate is lowered by a factor of 16 (to 3.4375 KHz) to allow an increase in peak laser power of a factor of 2. The advantage of noise averaging as described herein can be exemplified by this case, where a 3.4375 KHz repetition rate laser rangefinder is operated at 55 KHz and, while suffering a signal reduction of a factor of 2, realizes a noise reduction of a factor of 4. Regulations concerning 'eye-safe' operation above 55 KHz require that the transmitted pulse energy be decreased in proportion to any repetition rate increase and, therefore, noise averaging at repetition frequencies greater than 55 KHz becomes increasingly inefficient.

The use of high laser pulse repetition frequencies, on the order of 55 KHz, and noise averaging as described above, can improve the performance of a laser rangefinder by a significant degree. Additionally, however, certain precautions can be used to further reduce noise generated within the laser rangefinder unit and that could be conducted through space as electrostatic or electromagnetic disturbances to the photodiode amplification circuitry. These precautions are now described.

The generation of extremely brief, high power laser pulses often employs a switching power supply to charge a capacitor that can be abruptly discharged into a laser diode. Such switching supplies, with commutating diodes and high current switches, can generate deleterious noise that is difficult to shield from the sensitive photodiode electronics. High voltages are often employed to overcome the delaying effects of component lead inductance associated with laser diodes and driving circuitry. A later part of this disclosure describes a method of using a single inductor in conjunction with a traditional laser diode switching device and storage capacitor. It is described that very high energy efficiency can be obtained, also achieving high capacitor charge voltages, while ensuring that the circuitry switches in synchrony with the capacitor discharge, with no (or a minimum of) other noise generating events (as would be found in a traditional switching power supply) to contaminate the sensitive photodiode environment.

Additionally, the memory described above is effectively representing a bank of counters, as each memory location can be either incremented in value or left with its value unchanged after each access. A bank of counters can be substituted for the memory, and power consumption can accordingly be reduced, as the use of a counter bank is generally such that each counter is addressed and affected individually, but generally a memory bank is completely precharged on each memory access; a net power reduction and a lowering of transient currents in the processing circuitry can result from the use of a counter bank over a memory array.

Further, the clock frequencies used in the clocking of the photodiode signal comparator and the addressing of the memory (or counter bank) can often be quite high, exceeding 100 MHz for a device with 1 meter resolution. Interpolation techniques can be used on integrated signal sequences to obtain resolution that exceeds the sampling clock period, but accuracy will typically suffer as higher resolution is sought; therefore, high sample clock frequencies can be employed. Also, the sample clock frequency should be accurate, preferably being derived from a quartz crystal for measurement accuracy. Traditionally, a phase locked loop (PLL) employing a crystal oscillator of reasonable frequency (4 to 20 MHz) would be used, effectively multiplying the crystal frequency to a higher sample clock frequency. The inclusion of such a lower frequency signal in a laser rangefinder system is attractive, as an included microcontroller would employ such a clock frequency, the microcontroller being used to analyze the integrated signal sequences and drive a display. In such a situation, electronic noises generated by the crystal oscillator and other devices driven by that crystal frequency (such as a microcontroller) could repetitively occur at select moments of time.

Thus, in some embodiments, the system is configured such that the noise generated as a result of the crystal frequency is asynchronous to the laser pulse receive timing circuitry. More particularly, such noise is more or less spread across the time sequence of the photodiode signal clocking processes, causing the resulting noises to be more or less equally distributed throughout the integrated signal time sequence.

For example, in one particular embodiment, a prime number is used for the frequency multiplying factor in the PLL, forcing the repetitive noises at the crystal frequency to be spread across the time sequence of the photodiode signal clocking process. In accordance with other embodiments, other configurations are employed to distribute the noise through the integrated signal time sequence of the photodiode signal clocking process.

As an alternative to the above, the system described is repetitive, and a method of repeating the sequence of laser firing and signal acquisition is timed by some method, e.g., through the use of a counter, driven by the sample clock frequency, that controls the laser pulse repetition rate. The use of a prime number in defining the number of sample clocks between each laser pulse, while a non-prime number acts as the PLL multiplier, is also effective in reducing the effects of crystal frequency noises on the integrated signal sequence results.

Finally, the counter that times the laser pulse and directs the addressing of the signal integration memory (or counter bank) employs switching power on each clock pulse, and if these power pulses are not uniform, a pattern noise can also be generated that can find its way deleteriously to the photodiode receive circuitry. In one example, a Grey counter is used for the addressing of the memory (or counter array). A Grey counter has as a feature the characteristic of causing only one bit to change on each applied clock pulse. The use of a Grey counter in the addressing of the memory (or counter array) therefore causes the deleterious noise to occur uniformly across each of the time periods in the signal integration sequence, averaging this noise effect toward zero.

Some typical design values for the herein described system follows.

| | |
|---|---|
| Pulse repetition rate | 53.38541 KHz |
| Laser pulse peak amplitude | 3 W |
| Laser pulse half amplitude duration | 6 nS |
| Receiver upper band limit | 80 MHz |
| System sample clock | 164.0 MHz |
| Crystal frequency | 4.00 MHz |
| PLL multiplier | 41 |
| Memory locations | 256 |
| Memory data value width | 16 bits |
| Effective range | 3 to 256 yards |

It is to be understood that modifications of the above system vales can be made without deviating from the meaning and spirit of this invention.

We now describe a power switching system that is, for example, usable in a laser rangefinder that is executing the method described above. The power switching system herein described includes a MOSFET switching device, a pulsed laser diode, an inductor, a storage capacitor, a laser diode shunt resistor, and an optional current limiting resistor. The gate of the MOSFET is to be driven by a continuous pulse wave signal of constant duty cycle, supplied by the signal processing/timing circuitry of the rangefinder.

Figure 2:
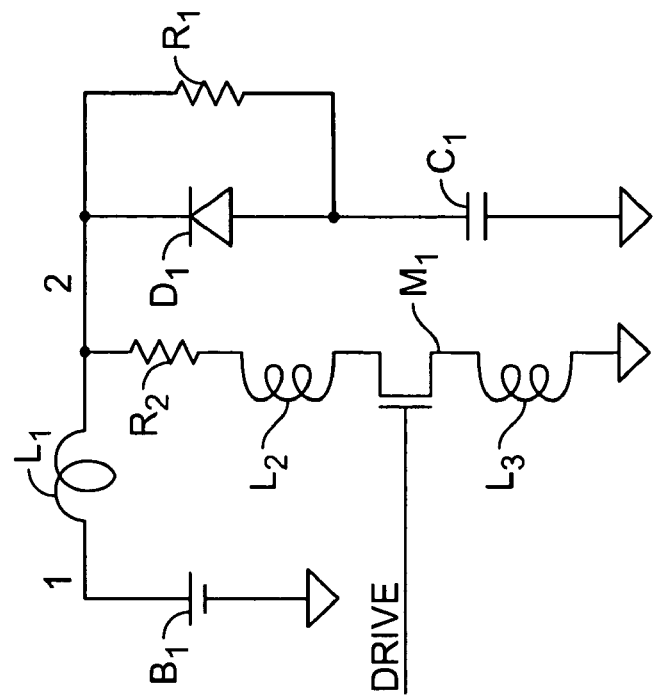
FIG. 1 and FIG. 2 illustrate alternate circuit embodiments of a synchronous power supply and laser diode driver.
Figure 1:
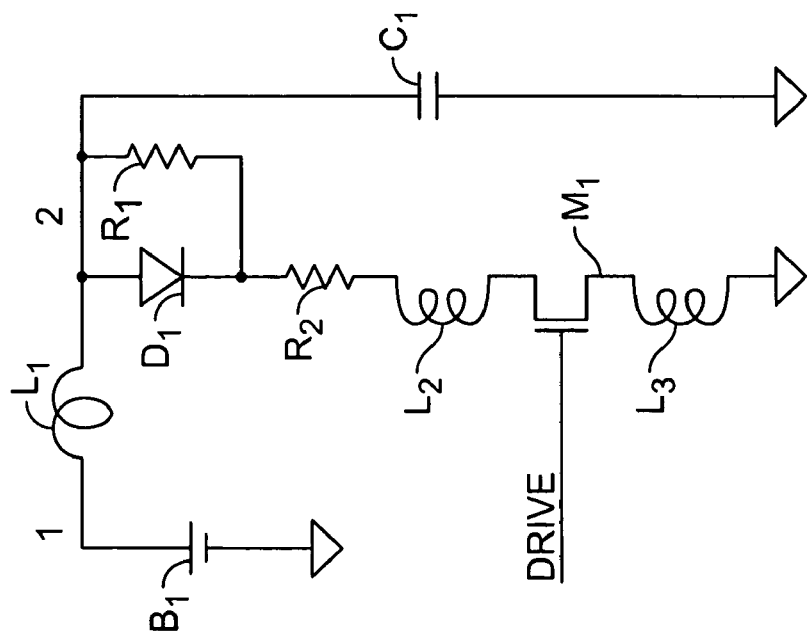

It is to be understood that the circuits shown in FIG. 1 and FIG. 2 are alternate embodiments. Other rearrangements of the basic components may perform similarly.

FIG. 1 shows one example circuit description. The battery power source B1 delivers current through inductor L1 to the storage capacitor C1 and to the laser diode D1 and the MOSFET switch M1, along with the associated resistors R1 and R2. Inductors L2 and L3 are the principal unavoidable (and unintentional) stray inductances associated with the wiring of the circuit. In operation, the signal DRIVE, supplied by the rangefinder's timing and processing circuitry, alternately turns MOSFET M1 on and off, at a constant frequency, and with a fixed duty cycle. While M1 is on, the voltage at point 2 is essentially zero and current builds in inductor L1, at a rate that is based on L1's inductance and the battery potential. The voltage drop across M1 and resistors R1 and R2 during this part of the cycle is essentially zero, as the current is low, and the values of R1 and R2 are also low, on the order of 0.5 to 5 ohms. When MOSFET M1 turns off, the energy stored in L1 can be described as:

$$E=((I*L)^2)/2$$

Where:

I=current through L1 at the time M1 turns off (amperes),
L=Inductance of L1 (Henrys),
E=energy (Joules)

When M1 turns off, the energy invested in L1 will begin to transfer to capacitor C1, charging C1 to a high potential. When M1 turns on again, C1 is discharged abruptly through R2 and D1, producing a very high current, short duration pulse through the laser diode D1, and then the cycle repeats. The voltage on C1 at the moment that M1 turns on depends on the battery voltage, the duty cycle and frequency of the signal DRIVE, and the values of C1 and L1. The value of R2 and the associated stray circuit inductances, along with the voltage on C1 and its capacitance value, at the moment of M1 turning on, determines the laser diode current pulse peak amplitude and duration. R1 is selected to dampen the resonance of C1 and the stray inductances L2 and L3, and R2 is selected to keep the reverse voltage across the laser diode, due to this resonance, below the damaging threshold for the laser diode (typically around 3 volts). A higher duty cycle of signal DRIVE leads to a higher battery current and a higher peak voltage on C1. The value of L1 is preferably such that its resonant frequency with C1 has a half period equal to the MOSFET's off period. If L1 has a value lower than this preferred value, the voltage on C1 will peak and then begin to diminish before M1 turns on, leading to a diminished laser current pulse; if L1's value is higher than this preferred value, then more energy will be stored in L1 than is necessary, and L1's cost will be greater than required. At a preferred value for L1, all of its invested energy is transferred completely to the capacitor at the moment M1 turns on.

In operation of the rangefinder, the maximum usable range of the device corresponds to a defined period of time (approximately 6 ns per yard, times the number of yards of usable range). Provided the on time of M1 exceeds the total period in which signal is received, the system will be 'quiet' during the receipt of the extremely faint return light pulse. As a consequence, the light pulse is emitted from the laser diode and, immediately thereafter, the only disturbance to the receive system is a slowly increasing current through inductor L1.

The process of charging a capacitor to a high voltage and then discharging it into a laser diode through lead inductances and damping resistors is highly inefficient. The desire for an intense but brief light pulse, in the presence of unavoidable lead inductances however, makes such an inefficient scheme justified. Although the overall process is generally inefficient, a doubling of overall efficiency may be gained over devices that use a switching power supply with a constant current or resistive capacitor charging method. Because energy can be coupled from the battery to the charging capacitor with virtually no loss, a significant reduction in battery current can be realized.

Typical values for a simple rangefinder:

| | |
|---|---|
| Design 1: | |
| Operation frequency | 55 KHz |
| Duty cycle | 50% |
| Battery voltage | 5 V |
| Peak capacitor voltage | 17 V |
| Capacitor value | 2.2 nF |
| Inductor value | 10 mH |
| Peak laser diode current | 2.8 A |
| Laser pulse half width | 9 nS |
| Damping resistor value (R2) | 0.5 ohms |
| Shunt resistor value (R1) | 5 ohms |
| Average battery current | 3.8 mA |
| Design 2: | |

-continued

| | | |
|---|---|---|
| Operation frequency | 55 | KHz |
| Duty cycle | 75% | |
| Battery voltage | 5 | V |
| Peak capacitor voltage | 32 | V |
| Capacitor value | 2.2 | nF |
| Inductor value | 3.5 | mH |
| Peak laser diode current | 4.7 | A |
| Laser pulse half width | 12 | nS |
| Damping resistor value (R2) | 0.5 | ohms |
| Shunt resistor value (R1) | 5 | ohms |
| Average battery current | 12 | mA |

What is claimed as new and desired to be protected by Letters Patent of the United States is:

1. A method to process a signal resulting from a series of emitted laser pulses being reflected from a distant object, during a detection time period that includes a plurality of time sequences, each time sequence including a plurality of sample periods, each sample period in a particular time sequence having a corresponding sample period in each other time sequence, the method comprising:

at each particular sample period, sampling the return signal reflected from the object and comparing the sampled return signal to a signal representative of an averaged value of the return signal;

accumulating a result of the comparison with comparison results for corresponding sample periods, including the particular sample period and the sample periods in the other time sequences, for the particular sample period; and processing the accumulated comparison results and determining therefrom the distance to the object.

2. The method of claim 1, wherein:
the accumulating step includes:
maintaining an index to indicate the accumulated result for each set of corresponding sample periods; and
modifying the index based on a state of a sampling clock that has a period corresponding to the length of the sample periods.

3. The method of claim 2, wherein:
the accumulating step further includes resetting the index based on each emission of a laser pulse.

4. The method of claim 1, wherein:
the processing and determining step includes:
detecting which comparison results indicate the distance to the object and which comparison results indicate noise; and
based on the determination, determining the time associated with the reflection of the return signal.

5. The method of claim 4, wherein:
determining which comparison results include noise includes:
determining which comparison results do not meet a threshold value, wherein the threshold value is based on half of the sampling periods being different from the averaged value of the return signal.

6. The method of claim 5, wherein:
the threshold value being different from the averaged value of the return signal allows for a statistically significant difference.

7. A method for a laser rangefinder to process a laser rangefinder reflected signal resulting from a series of emitted laser pulses, during a detection time period that includes a plurality of time sequences, each time sequence including a plurality of sample periods, each sample period in a particular time sequence having a corresponding sample period in every other time sequence, comprising:

at each particular sample period, sampling the return signal and comparing the sampled return signal to a signal that is representative of an averaged value of the return signal;

accumulating a result of the comparison with comparison results for a set of collective corresponding sample periods, including the particular sample period and the sample periods, in the other time sequences, corresponding to the particular sample period; and processing the accumulated comparison results and determining therefrom a time associated with a particular characteristic of the return signal;

wherein the processing and determining step includes:
detecting which comparison results indicate the particular characteristic of the return signal and which comparison results indicate only noise; and
based on the determination, determining the time associated with the particular characteristic of the return signal.

8. The method of claim 7, wherein:
determining which comparison results include noise only includes:
determining which comparison results do not meet a threshold value, wherein the threshold value is based on half of the collective sampling periods being different from the averaged value of the return signal.

9. The method of claim 8, wherein:
the threshold value being different from the averaged value of the return signal allows for a statistically significant difference.

10. A rangefinder comprising:
a laser emitting a series of laser pulses; and
circuitry to process a signal resulting from the series of laser pulses being reflected from a distant object during a detection time period that includes a plurality of time sequences, each time sequence including a plurality of sample periods, each sample period in a particular time sequence having a corresponding sample period in each other time sequence, the circuitry including:

a photosensor to receive the reflected signal;
an amplifier coupled to the photosensor and to output a voltage signal;
a comparator coupled to the amplifier to sample the voltage signal at each particular sample period;
the comparator also being coupled to receive a signal representative of the averaged value of the voltage signal;
a counter memory coupled to receive an output signal from the comparator and to accumulate a result of the comparison with comparison results for corresponding sample periods, including the particular sample period and the sample periods in other time sequences, for the particular sample period; and
a processor coupled to the counter memory and which determines from the comparison results the distance to the object.

* * * * *